United States Patent
Dhaka et al.

(10) Patent No.: US 12,289,214 B2
(45) Date of Patent: Apr. 29, 2025

(54) SITE IMPACT ANALYSIS FOR NETWORK IMPROVEMENT

(71) Applicant: RAKUTEN SYMPHONY, INC., Tokyo (JP)

(72) Inventors: Prithvi Raj Dhaka, Indore (IN); Gourav Deshlehra, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/905,824

(22) PCT Filed: Jul. 22, 2022

(86) PCT No.: PCT/US2022/037960
§ 371 (c)(1),
(2) Date: Sep. 8, 2022

(87) PCT Pub. No.: WO2024/019729
PCT Pub. Date: Jan. 25, 2024

(65) Prior Publication Data
US 2024/0205097 A1   Jun. 20, 2024

(51) Int. Cl.
*H04W 24/02* (2009.01)
*G06N 7/01* (2023.01)
(Continued)

(52) U.S. Cl.
CPC .............. *H04L 41/14* (2013.01); *H04L 41/22* (2013.01); *H04W 24/10* (2013.01)

(58) Field of Classification Search
CPC ................. G06N 7/01; G06Q 30/0201; G06Q 10/06393; G06Q 30/0202; G06Q 30/0247;
(Continued)

(56) References Cited

U.S. PATENT DOCUMENTS

2018/0184344 A1   6/2018   Periyasamy et al.
2018/0225587 A1*  8/2018   Khidekel ........... G06Q 30/0201
(Continued)

OTHER PUBLICATIONS

Part & Sum, "How We Use Causal Impact Analysis", https://www.youtube.com/watch?v=8JxZzdw8XfU Jul. 15, 2020 (Year: 2020).*

*Primary Examiner* — Nicholas R Taylor
*Assistant Examiner* — Ho T Shiu
(74) *Attorney, Agent, or Firm* — HAUPTMAN HAM, LLP

(57) ABSTRACT

A device and method for new site impact analysis for network improvement. Key Performance Indicator (KPI) data is from a KPI database. A new site impact analysis graphical user interface (GUI) for analyzing an impact of a new site to the network is presented on a display device. A report GUI is presented on the display device for making a selection for generating a report including data associated with the impact of the new site. Based on the KPI data, the report is generated according to the selection made using the report GUI and displaying the report on the display device. At least one of a cluster of neighbor cells and the new site are configured to improve performance of the network based on the generated report. After configuring the at least one of the cluster of neighbor cells and the new site, the new site impact analysis GUI is used to bring the new site on-air.

20 Claims, 11 Drawing Sheets

(51) Int. Cl.
*H04L 41/14* (2022.01)
*H04L 41/22* (2022.01)
*H04W 16/22* (2009.01)
*H04W 24/08* (2009.01)
*H04W 24/10* (2009.01)

(58) Field of Classification Search
CPC ............ H04W 41/147; H04W 41/064; H04W 41/0895; H04W 41/0896; H04W 41/14; H04W 43/08; H04W 43/0879; H04W 43/091; H04W 43/55
See application file for complete search history.

(56) References Cited

U.S. PATENT DOCUMENTS

| | | | |
|---|---|---|---|
| 2020/0154365 A1 | 5/2020 | Abdelmonem et al. | |
| 2021/0400501 A1* | 12/2021 | Wakim | G06Q 30/0201 |
| 2022/0188843 A1* | 6/2022 | Michalsky | G06N 20/00 |
| 2022/0400423 A1* | 12/2022 | Vivanco | H04W 36/08 |
| 2023/0239725 A1* | 7/2023 | Wakim | H04W 28/0242 370/329 |
| 2024/0160835 A1* | 5/2024 | Trivedi | G06F 3/0482 |

* cited by examiner

| Header Name | Header Description — 720 |
|---|---|
| Site Name | Name of the Site — 732 |
| Band | If Site Selected in all Bands : 2300/850 — 742<br>If Site Selected in Only 2300 : 2300 — 744<br>If Site Selected in Only 850 : 850 — 746 |
| Cell Category | There will be the following Categories Based on the Report Selected:<br>752 — 1) Pre Date Cells —<br>• Pre KPIs of All Neighbors of the Selected Sites (Excluding the Cells of the Selected Site). — 754<br>756 — 2) Post Date Cells —<br>• Post KPIs of the Co-site Neighbors of the Selected Sites. — 758<br>760 — 3) Pre Date Target Sectors —<br>• Pre KPIs of All Neighbors of the Selected Sites (Excluding the Cells of the Selected Site). — 762<br>764 — 4) Post Date Target Sectors —<br>• Post KPIs of the Co-site Neighbors of the Selected Sites. — 766 |
| Cell Name | Name of the Cell — 772 |
| Date | Pre User Selected Date / EMS Live Date — 782 |
| Time | 792 — Three Network busy hours — 796<br>794 — (11:00 ~ 12:00 Hrs.), (17:00 ~ 18:00 Hrs.), (21:00 ~ 22:00 Hrs.) — 798 |

700 — (table), 710 — Header Name, 730 — Site Name, 740 — Band, 750 — Cell Category, 770 — Cell Name, 780 — Date, 790 — Time

FIG. 7

| Report Header Name | Report Header Description ⟵820 | | |
|---|---|---|---|
| Site Name ⟵830 | Name of Site ⟵832 | | |
| Band ⟵840 | If Site is Coming in All Bands : 2300/850 ⟵842 | | |
| | If Site is Coming in Only 2300 : 2300 ⟵844 | | |
| | If Site is Coming in Only 850 : 850 ⟵846 | | |
| KPI ⟵850 | KPI List Compared in the Detailed Report Worksheet ⟵852 | | |
| Cluster Pre KPIs ⟵860 | Aggregated Value of the KPIs of all Neighbors of the New Site without New Site ⟵862 | | |
| Cluster Post KPIs ⟵870 | Aggregated Value of the KPIs of all Neighbors of the New Site with New Site ⟵872 | | |
| Delta ⟵880 | Cluster Post KPI - Cluster Pre KPI ⟵882 | | |
| %Delta ⟵890 | (((Cluster Post KPI - Cluster Pre KPI)/ (Cluster Pre KPIs))*100 ⟵892 | | |

| A | B |
|---|---|
| Intra eNB Attempt(Count) | Intra eNB Attempt(Count)_FS ID0155 |
| Intra Freq Ho Attempt(Count) | Intra Freq Ho Attempt(Count)_FS ID0156 |
| S1 Setup Att(Count) | S1 Setup Att(Count)_FS ID0157 |
| S1 Setup SR (%) | S1 Setup SR(%)_FS ID0158 |
| Inter Freq Attempt(Count) | Inter Freq Attempt(Count)_FS ID0159 |
| Total Traffic Volume(GByte) | Total Traffic Volume(GByte)_FS ID0160 |
| UE DL IP Throughput(Mbps) | UE DL IP Throughput(Mbps)_FS ID0161 |
| UL BLER (%) | UL BLER(%)_FS ID0162 |
| DL BLER (%) | DL BLER(%)_FS ID0163 |
| Max Active Users(Count) | Max Active Users(Count)_FS ID0164 |
| Avg UL Active Users(Count) | Avg UL Active Users(Count)_FS ID0314 |
| Avg DL Active Users(Count) | Avg DL Active Users(Count)_FS ID0315 |
| Max DL Active Users(Count) | Max DL Active Users(Count)_FS ID0316 |
| Max UL Active Users(Count) | Max UL Active Users(Count)_FS ID0317 |
| Avg MCS - DL(Count) | Avg MCS - DL(Count)_FS ID0318 |
| Avg MCS - UL(Count) | Avg MCS - UL(Count)_FS ID0319 |
| S1 Set up success rate % | S1 Set up success rate %_FS ID0320 |
| DL User throughput (Kbps) | DL User throughput (Kbps)_FS ID0321 |
| UL User throughput (Kbps) | UL User throughput (Kbps)_FS ID0322 |

FIG. 9 (Continue)

SITE IMPACT ANALYSIS FOR NETWORK IMPROVEMENT

RELATED APPLICATIONS

The present application is a National Phase of International Application No. PCT/US2022/037960, filed Jul. 22, 2022.

TECHNICAL FIELD

This description relates to new site impact analysis for network improvement, and method of using the same.

BACKGROUND

The rapid rollouts of new technologies with considerably high user volume on the existing technologies has created a demand for more robust planning. End users want to see a top performing network right from the launch. In telecommunication, a geographical coverage area is divided into different sized cells, namely micro and macro. This communication takes place on a certain band of frequencies also known as channels. The channels are broadly divided into uplink and downlink depending on the flow of data.

RF Planning for mobile and cellular communication systems is used to provide acceptable coverage and capacity for the services (e.g., mobile telephony). RF Planning is used to achieve placement of base stations for providing improved coverage, and depends on traffic distribution, base station positions, power levels, type of antennas, heights of antennas, etc.

To determine placement of cell sites, numerous factors are considered. Some examples of such factors include radio network dimensioning, planning of the coverage and capacity, determining frequency allocation, and interference analysis. Moreover, RF planning includes field measurement to determine the potential cell-site suitability. Physical cell tests are conducted in the form of drive tests and site visits. Drive tests are used to calibrate the radio-frequency propagation models used in the RF plan. Site visits are used to perform radio-frequency suitability analysis.

Determining the impact of a new on-air site involves manually calculations. However, manual calculation is not accurate and takes a long time to complete. After the time and effort are spent to develop the RF plan, then further calculations and analysis are performed to refine and improve the coverage and capacity of a new site. The sheer number of cell sites for a given network area can create complexities that overwhelm a designer. Often, the result is cell placement that does not satisfy Key Performance Indicators (KPIs) desired for the cell site that is acquired at an extraordinary cost.

SUMMARY

In at least embodiment, a method for includes obtaining Key Performance Indicator (KPI) data from a KPI database, presenting, on a display device, a new site impact analysis graphical user interface (GUI) for analyzing an impact of a new site to the network, presenting, on the display device, a report GUI for making a selection for generating a report including data associated with the impact of the new site, based on the KPI data, generating the report according to the selection made using the report GUI and displaying the report on the display device, configuring, on the new site impact analysis GUI, at least one of a cluster of neighbor cells and the new site to improve performance of the network based on the generated report, and after configuring the at least one of the cluster of neighbor cells and the new site, the new site impact analysis GUI is used to bring the new site on-air.

In at least one embodiment, a device for providing new site impact analysis for network improvement includes a memory storing computer-readable instructions, and a processor connected to the memory, wherein the processor is configured to execute the computer-readable instructions to obtain Key Performance Indicator (KPI) data from a KPI database, present, on the display device, a new site impact analysis graphical user interface (GUI) for analyzing an impact of a new site on the network, present, on the display device, a report GUI for receiving a selection for generating a report including data associated with the impact of the new site, based on the KPI data, generate the report according to the selection received using the report GUI and displaying the report on the display device, receive configuration input, on the new site impact analysis GUI, for configuring at least one of a cluster of neighbor cells and the new site to improve performance of the network based on the generated report, and after configuring the at least one of the cluster of neighbor cells and the new site, use the new site impact analysis GUI to bring the new site on-air.

In at least one embodiment, a non-transitory computer-readable media having computer-readable instructions stored thereon, which when executed by a processor causes the processor to obtaining Key Performance Indicator (KPI) data from a KPI database, presenting, on a display device, a new site impact analysis graphical user interface (GUI) for analyzing an impact of a new site to the network, presenting, on the display device, a report GUI for making a selection for generating a report including data associated with the impact of the new site, based on the KPI data, generating the report according to the selection made using the report GUI and displaying the report on the display device, configuring, on the new site impact analysis GUI, at least one of a cluster of neighbor cells and the new site to improve performance of the network based on the generated report, and after configuring the at least one of the cluster of neighbor cells and the new site, using the new site impact analysis GUI to bring the new site on-air.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 7 shows a Detailed Report Worksheet according to at least one embodiment.

FIG. 8 shows a Cluster Report Worksheet according to at least one embodiment.

DETAILED DESCRIPTION

Figure 1:
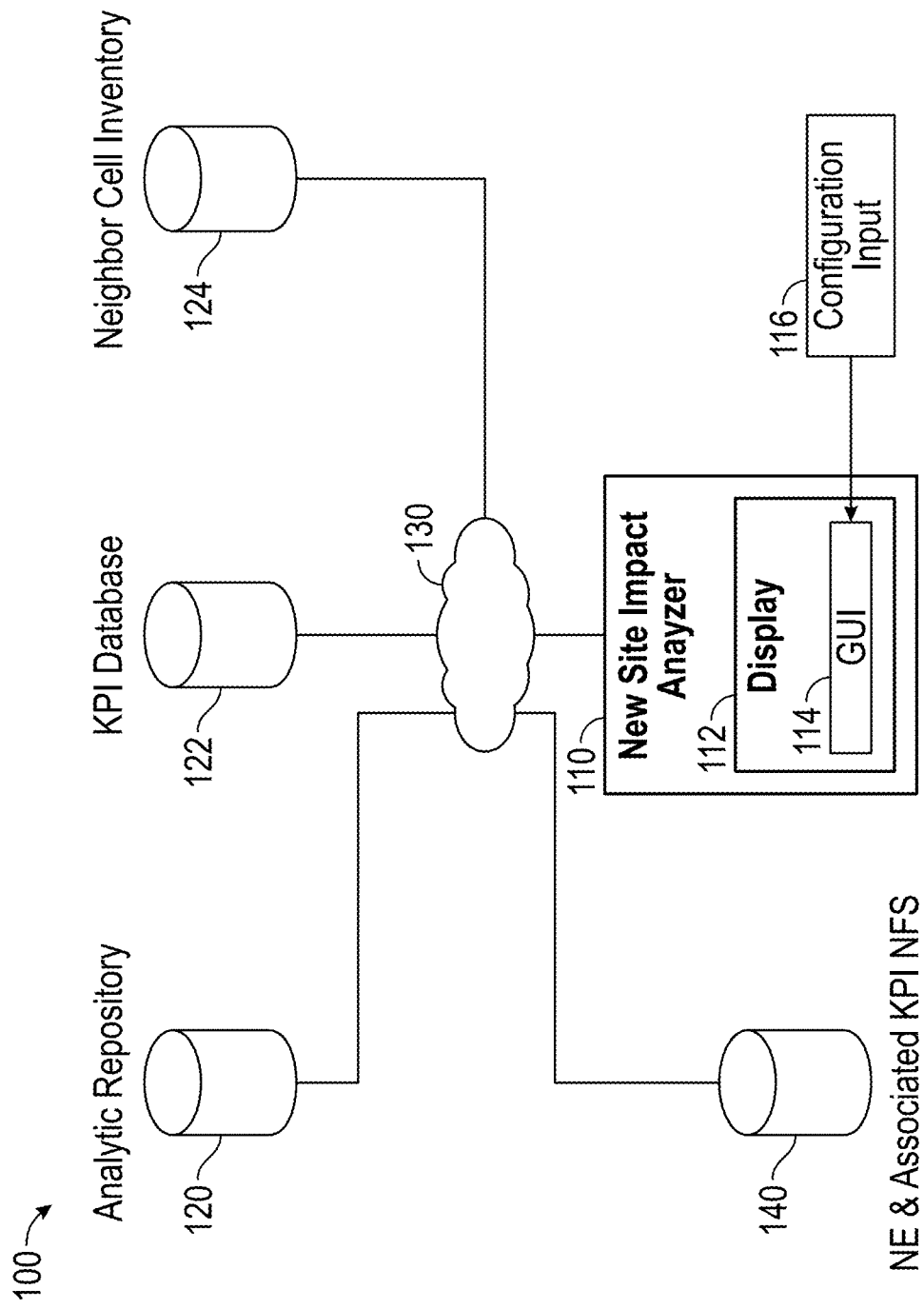
FIG. 1 is a block diagram of a system for performing new site impact analysis for network improvement according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or any data-stream or signaling-stream. The foregoing terms are utilized interchangeably in the subject specification and related drawings. The terms "access point," "base station," "Node B," "evolved Node B (eNode B or eNB)," next generation Node B (gNB), enhanced gNB (en-gNB), home Node B (HNB)," "home access point (HAP)," or the like refer to a wireless network component or apparatus that serves and receives data, control, voice, video, sound, gaming, or any data-stream or signaling-stream from UE.

A geographical area covered by mobile telecommunication network is referred to as "cells." A cell site includes a Radio Access Network (RAN), which includes a base station and one or more antenna. The RAN provides radio coverage to a cell. A cell site is a location or a point that gives radio coverage to a cell, whereas the cell refers to a geographical or physical area serviced by a base station (e.g., evolved Node B (eNB), g Node B (gNB) at the cell site. Cells can be categorized according to associated coverage area, including macrocells, microcells, picocells and femtocells, which, as listed, provides decreasing cell radii (i.e., coverage area) and decreasing transmit power levels. Some RAN use multiple directional antennas to split a cell site into sectors that covering a portion of the cell geography, e.g., 120°, 60°, etc.

Embodiments described herein provide an automated process that determines, in one click, the impact of bring a New Site "On-Air" within a cluster. As used herein, a New Site refers to any additional device providing new coverage to a mobile telecommunication network regardless of coverage area (e.g., macro, micro, etc.) or cell geography covered (e.g., entire cell, sectors, etc.).

A new site impact analysis User Interface (UI) is presented on a display. The UI presents a visually representation of cell sites prior to a new site is brought "on-air" and identifies visually areas that are to be improved. The UI presents the results after actions to improve network performance have been implemented. After the actions have been completed to improve network performance, the UI presents a new site "on-air" representation showing the status of cell sites. The UI presents impact reports including a detailed report worksheet and a cluster report worksheet. The UI also presents Key Performance Indicators (KPIs).

Advantages include enabling a user to automatically calculate and visualize the impact of bringing a New Site "On-Air" via the UI and the reports. In at least one embodiment, the information is refreshed on a regular basis, e.g., every day. Pre-analysis and post-analysis of Key Performance Indicators (KPIs) is performed up to 7 days pre- and post-on-air date of new sites. The process runs automatically for a large number of sites, including their cluster sites, and efficiently calculates the improvement of the vicinity due to an addition of a new site and improvements in terms of new coverage area and performance of existing neighbor cell sites.

FIG. 1 is a block diagram of a system 100 for performing new site impact analysis for network improvement according to at least one embodiment.

In FIG. 1 a New Site Impact Analyzer 110 is coupled to storage devices 120, 122, 124. The New Site Impact Analyzer 110 includes a Display 112. The Display 112 presents a Graphic User Interface (GUI) 114 for presenting new site impact analysis information.

New Site Impact Analyzer 110 accesses data from the one or more storage device 120, 122, 124. While three storage device one or more storage devices 120, 122, 124 are shown in FIG. 1, a greater number, or a fewer number of storage devices. New Site Impact Analyzer 110 is also shown communicating with the one or more storage devices 120, 122, 124 through cloud 130. However, in at least one embodiment, New Site Impact Analyzer 110 is coupled to the one or more storage devices 120, 122, 124 via a wireless network, a wired network, or via a communication bus.

New Site Impact Analyzer 110 obtains configuration data from analytic repository 120 and neighbor cell information from neighbor cell inventory 124. New Site Impact Analyzer 110 obtains Key Performance Indicator (KPI) data for specific Network Elements (NE) from KPI database 122. Time range information is acquired from the configuration data from the analytic repository 120. New Site Impact Analyzer 110 processes the KPI data in real time to produce analysis details. For example, in at least one embodiment, Spark Flow is used to produce the analysis details. Then, New Site Impact Analyzer 110 creates a database of KPI data for network elements based on the KPI values. New Site Impact Analyzer 110 stores NE data and the associated KPI data. For example, in at least one embodiment, the NE data and the associated KPI data is stored in a network file server (NFS) 140. New Site Impact Analyzer 110 receives configuration input 116, on the GUI 112, for configuring at least one of a cluster of neighbor cells and the new site to improve performance of the network based on the generated report. After configuring the at least one of the cluster of neighbor cells and the new site, the GUI 112 is used to bring the new site on-air.

Figure 2:
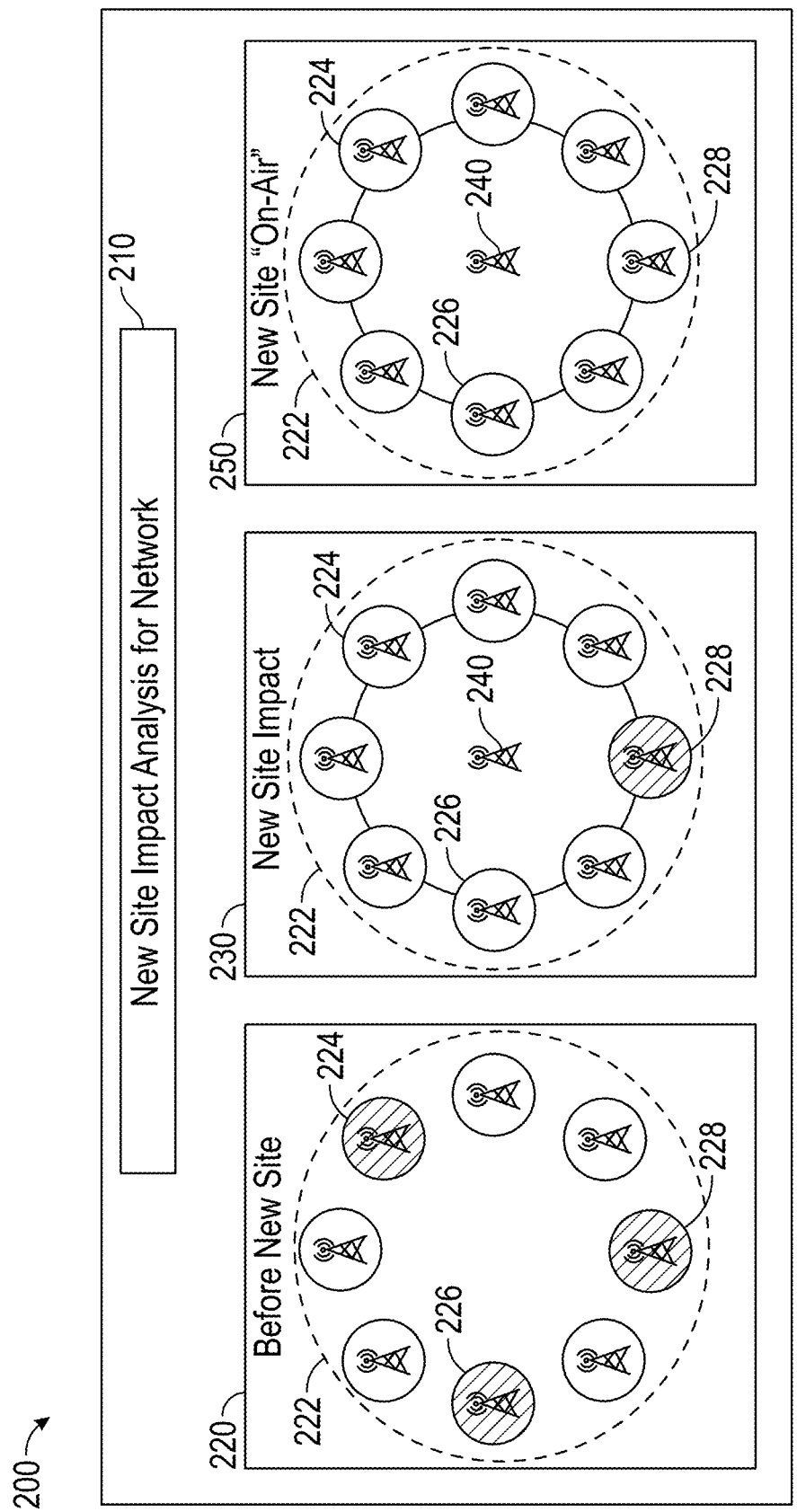
FIG. 2 illustrates a Graphic User Interface (GUI) for new site impact analysis according to at least one embodiment.

FIG. 2 illustrates a Graphic User Interface (GUI) 200 for new site impact analysis according to at least one embodiment.

In FIG. 2, GUI 200 includes a label indicating the GUI 200 is for performing New Site Impact Analysis for a Network 210. In at least one embodiment, a New Site refers to a complete cell, such as served by an omnidirectional antenna. In at least one embodiment, a New Site refers to a sector of a cell serviced by a directional antenna. In at least one embodiment, a New Site uses a first frequency band, which is different from neighbor cells or sectors.

GUI 200 includes a Before New Site window 220, a New Site Impact window 230, and a New Site "On-Air" window 250. Parameter changes and subsequent monitoring of performance of sites and cluster plays enables improvements during the lifecycle of telecommunications network. The impact of applied changes in the network is monitored and analyzed to provide improvements to the network. This pre- and post-analysis takes a long time using traditional Element Management System (EMS) based manual methods. EMS manages one or more of a specific type of telecommunications network element within a telecommunication management network (TMN). Typically, the EMS manages the functions and capabilities within each NE but does not manage the traffic between different NEs in the network. EMS is described as an example system for obtaining system data. In at least one embodiment, the system data is obtained using other systems.

In Before New Site window 220 eight existing cell sites 222 are shown. Of the eight cell sites 222, three sites 224, 226, 228 indicate performance issues. For example, in at least one embodiment, Key Performance Indicators (KPIs) are used to determine whether a cell site exhibits performance issues. In the New Site Impact window 230, data collected, for example by a performance monitoring system, is obtained from an inventory. The data includes the dates that the New Site comes "On-Air." At this time, steps that are to be performed to improve performance of the network and to bring the New Site "On-Air" are not known. New Site Impact window 230 shows eight existing cell sites 222. In New Site Impact window 230, New Site 240 has been added to the network between the eight existing cell sites 222. The impact area generation and the Pre-On-Air KPI calculations are triggered automatically in response to the New Site becoming "Live" on the EMS. New Site 240 and its Impact Area is regularly monitored until the 7 days post On Air date.

New Site Impact window 230 shows that existing cell sites 224 and 226 now exhibit no performance issues. However, existing cell cite 228 still exhibits performance issues. In at least one embodiment, at least one performance parameter for existing cell cite 228 is adjusted to improve the performance of existing cell cite 228, New Site 240, and the remaining seven of the eight existing cell sites 222, In at least one embodiment, at least one performance parameter for New Site 240 or the remaining seven of the eight existing cell sites 222 is adjusted to improve the performance of the existing cell cites 222 and New Site 240.

New Site "On-Air" window 250 also shows eight existing cell sites 222 and New Site 240 with New Site 240 having been brought "On-Air" after the improving the performance of the network in New Site Impact window 230. New Site "On-Air" window 250 shows New Site 240, and the eight existing cell sites 222, including cell site 224, cell site 226, and cell site 228, operating within acceptable performance parameters.

Figure 3:
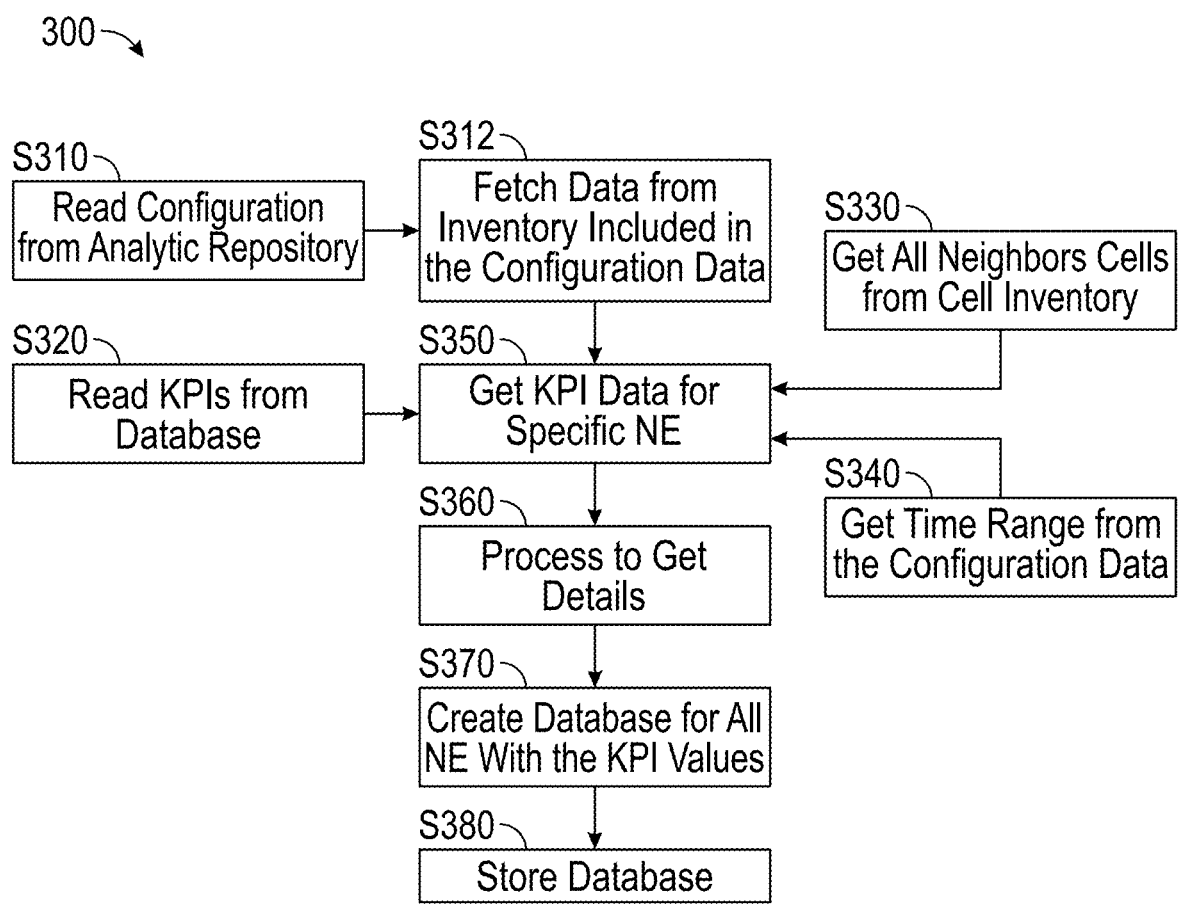
FIG. 3 is a flowchart of a method for performing new site impact analysis for improving performance of a network according to at least one embodiment.

FIG. 3 is a flowchart 300 of a method for performing new site impact analysis for improving performance of a network according to at least one embodiment.

In FIG. 3, configuration data is read from analytic repository S310. Data is fetched from inventory included in the configuration data S312. Key Performance Indicator (KPI) data for specific Network Elements (NE) is read from a KPI database S320. Neighbor cell information is obtained from cell inventory S330. Time range information is acquired from the configuration data S340. The configuration data, KPI data, neighbor cell information, and time range information are used to get KPI data for specific NEs.

New The KPI data is processes in real time to produce analysis details S360. For example, in at least one embodiment, Spark Flow is used to produce the analysis details. Then, a database for network elements based on the KPI values is created S370. The database for network elements based on the KPI values is stored. For example, in at least one embodiment, the database for network elements based on the KPI values is stored in a network file server (NFS) S380.

Figure 4:
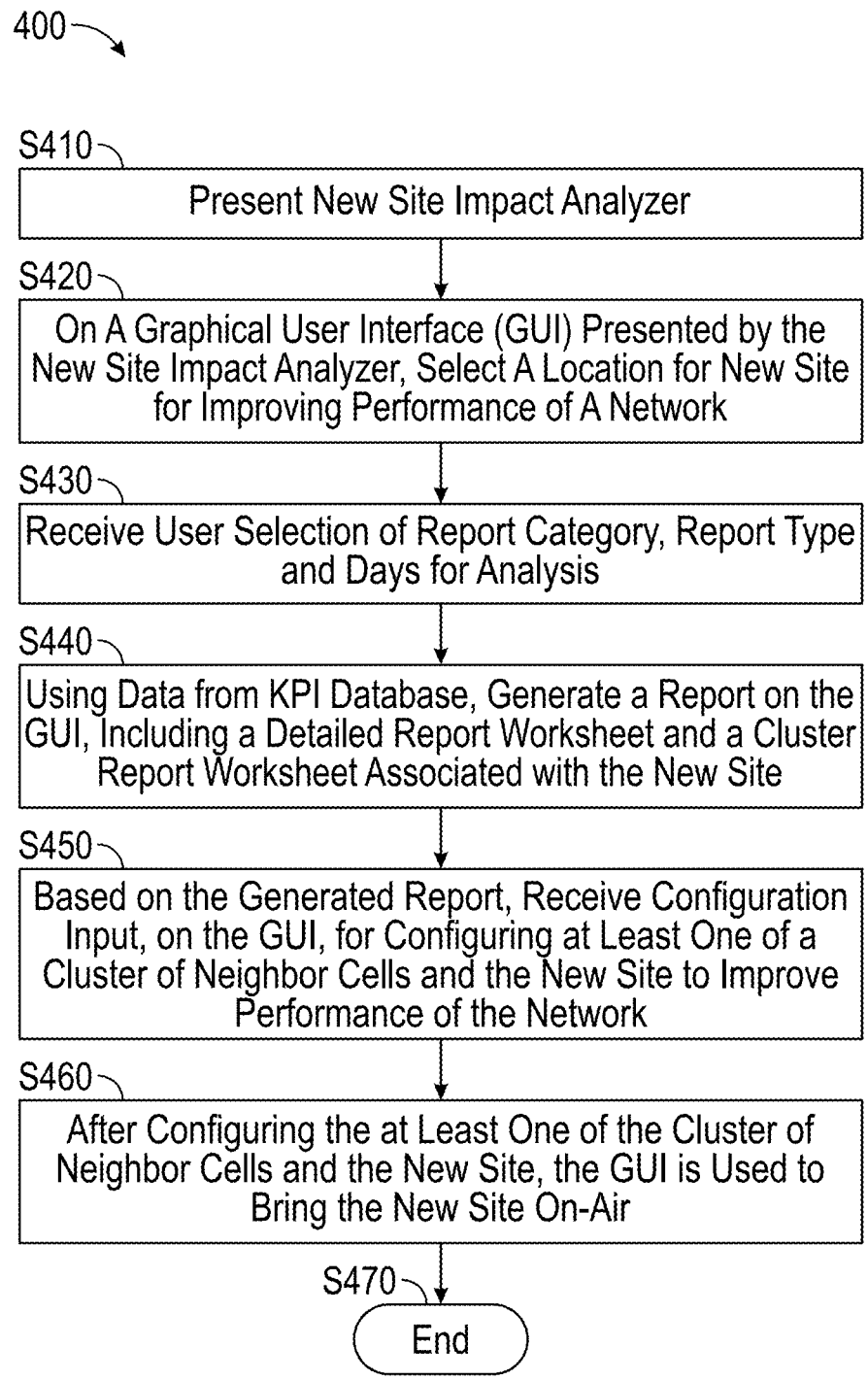
FIG. 4 is a flowchart of a method for presenting reports associated with the new site impact analysis according to at least one embodiment.

FIG. 4 is a flowchart 400 of a method for presenting reports associated with the new site impact analysis according to at least one embodiment.

In FIG. 4, a New Site Impact Analyzer is presented on a display device S410. On a Graphical User Interface (GUI) presented by the New Site Impact Analyzer, a location for the New Site is selected for improving performance of the network S420. A user selects a report category, a report type, and days for analysis using the impact analyzer S430. Using data from the KPI database, a Report, including a Detailed Report Worksheet and a Cluster Report Worksheet, is displayed in a GUI on the display device S440. Based on the generated report, configuration input is received on the GUI for configuring at least one of a cluster of neighbor cells and the New Site to improve performance of the network S450. After configuring the at least one of the cluster of neighbor cells and the new site, the GUI is used to bring the New Site "On-Air" S460. The process then terminates S470. The Detailed Report Worksheet and a Cluster Report Worksheet are described in more detail below.

Figure 5:
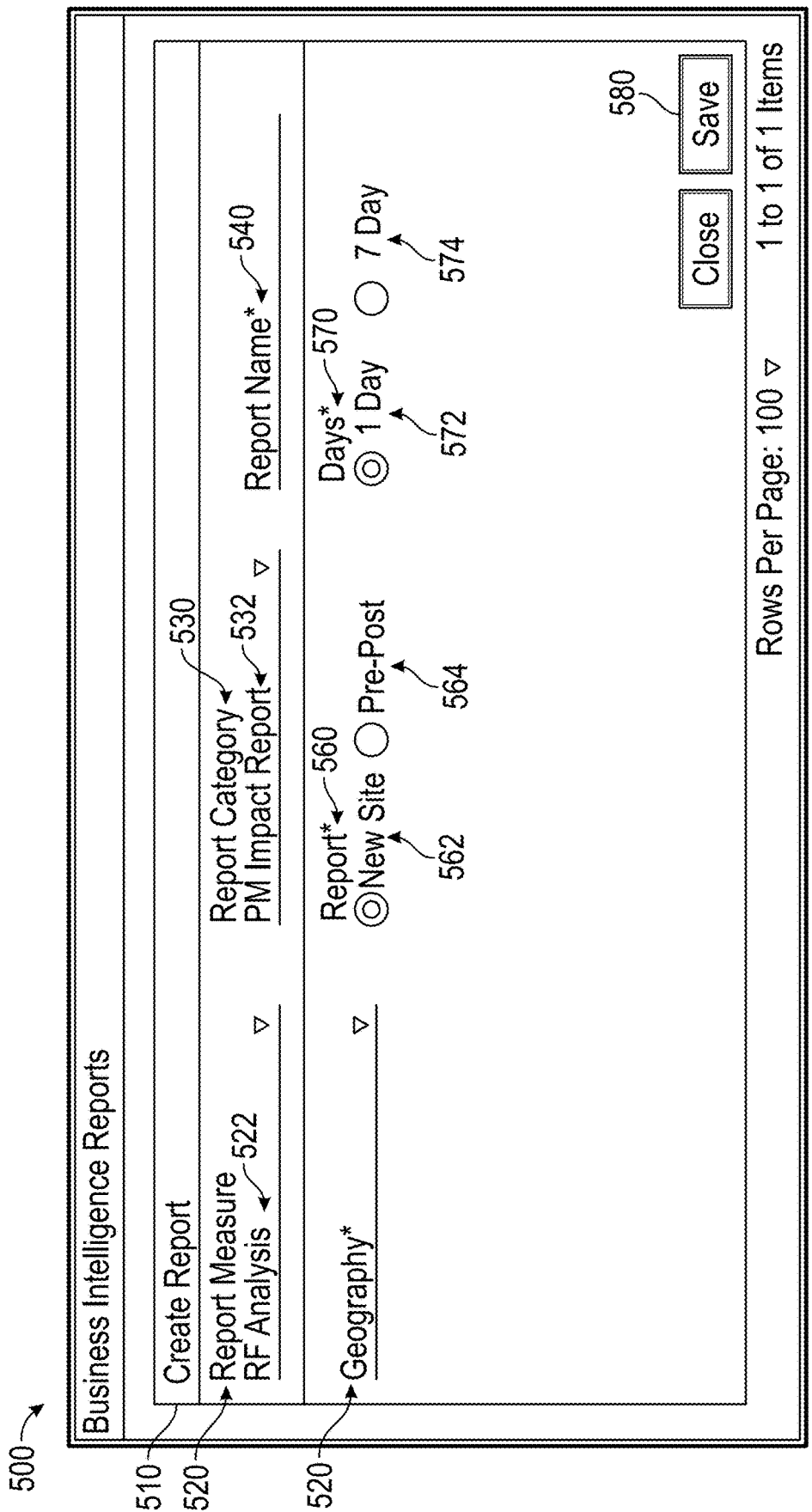
FIG. 5 illustrates a graphic user interface (GUI) for creating reports associated with the new site impact analysis according to at least one embodiment.

FIG. 5 illustrates a graphic user interface (GUI) 500 for creating reports associated with the new site impact analysis according to at least one embodiment.

In FIG. 5, GUI 500 for creating reports presents a Create Report window 510. The Create Report window 510 includes graphical control elements to allow a user to customize the report. In FIG. 5 a Report Measure drop down menu 520 allows a user to select RF Analysis 522. A Report Category drop down menu 530 allows a user to select a PM Impact Report 532. The selection of the PM Impact Report 532 provides the KPI Performance comparison of a cluster around a selected site (e.g., New Site and its neighbors). Cluster is defined as the list of neighbors around the site including cells of the site.

A Report Name Text Box 540 allows a user to enter a name for the report. A Geography drop down menu 550 allows a user to select a geography for the report. Report options 560 include New Site Radio Button 562 and Pre- Post Radio Button 564. Selection of the New Site Radio Button 562 prepares reports representing the New Site impact on the cluster of neighbors around the new site. Pre KPIs of the cluster will not contain the cells of the selected layer. Post- will contain the cells of the selected site. Selection of the Pre-Post Radio Button 564 prepares reports on the cluster of any selected On-Air site. Pre- and Post-cluster includes the selected cell.

Days options 570 include 1 Day Radio Button 572 and 7 Day Radio Button 574. Selection of the 1 Day Radio Button 572 calculates the Pre-Post- with just one day comparison. Selection of the 7 Day Radio Button 574 calculates the Pre-Post- with seven days comparison. For example, for a 7 selection, in response to the New Site is coming On-Air on June 8, the KPIs for the pre-dates of June 1 through June 7 and for the post-dates of June 9 through June 16 are KPIs are used. Once selections and input has been completed, the user selects Save button 580 to cause a report to be generated according to the selected options.

Using New Site Radio Button 562 and Pre-Post Radio Button 564 of Report options 560 and 1 Day Radio Button 572 and 7 Day Radio Button 574 of Days options 570 enables a user to select to generate a New Site Impact—1 Day report, a New Site Impact—7 days report, a Pre-Post KPIs—1 Day report, or a Pre-Post KPIs—7 days report.

Based on selections from the Report options 560 and Days options 570, reports are generated, including a Detailed Report Worksheet and Cluster Report Worksheet, for the New Site One Day selection, a New Site 7 Day selection, a Pre-Post One Day selection, and a Pre-Post One Day selection. After checking the KPIs, a determination is made whether the New Site meets acceptable operating parameters, e.g., the KPIs are acceptable. In response to the New Site meeting acceptable operating parameters, the New Site is brought "On-Air" to begin to handle calls and other operations. In a Cluster Report Worksheet, for example, the data is provided for 8 neighbor sites and the New Site, as shown in the New Site Impact window and in the New Site "on-Air window in FIG. 2. The Custer Report Worksheet includes the aggregated KPIs for the 9 sites (the 8 neighbor sites and the New Site).

Figure 6:
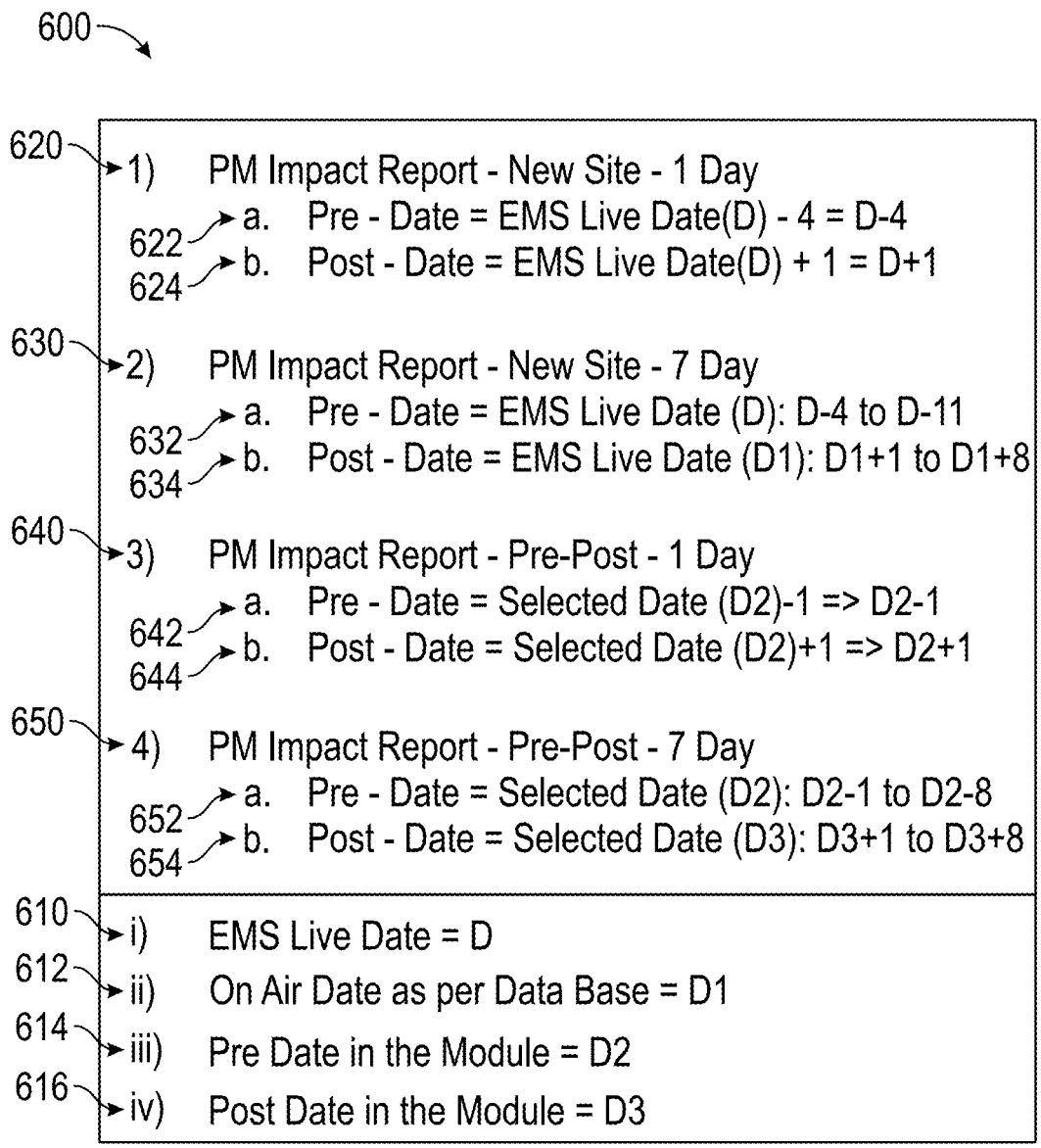
FIG. 6 is a chart showing calculations for pre- and post-dates for four report options according to at least one embodiment.

FIG. 6 is a chart 600 showing calculations for pre- and post-dates for four report options according to at least one embodiment.

In FIG. 6, EMS Live Date (D) 610 is automatically calculated based on three days consecutive live traffic once the site gets integrated. On-Air Date (D1) 612 is same or different from the EMS live date on a site-to-site basis. Pre-Date (D2) 614 is a number of day prior to the EMS Live Date (D) 610 or On-Air Date (D1) 612 that is used for analysis. Post-Date (D3) 616 is a number of days after the EMS Live Date (D) 610 or On-Air Date (D1) 612 that is used for analysis.

A PM Impact Report for New Site—1 Day 620 calculates a Pre Date according to EMS Live Date (D) −4 622, and calculates a Post Date according to EMS Live Date (D)+1 624. A PM Impact Report for New Site—1 Day 630 calculates a Pre Date according to EMS Live Date (D): D−4 to D−11 632, and calculates a Post Date according to On-Air Date (D1): D1+1 to D1+8 634. A PM Impact Report—Pre-Post—1 Day 640 calculates a Pre-Date according to Selected Date (D2) −1: D2−1 to D2−8 642, and calculates a Post-Date according to Selected Date (D3): D3+1 to D3+8 644. A PM Impact Report—Pre-Post—7 Day 650 calculates a Pre-Date according to Selected Date (D2) −1: D2−1 to D2−8 652, and calculates a Post-Date according to Selected Date (D3): D3+1 to D3+8 654.

FIG. 7 shows a Detailed Report Worksheet 700 according to at least one embodiment.

In FIG. 7, a Header Name 710 and a Header Description 720 for different parameters are shown. A Site Name 730 is for the Name of the Site 732. A Band 740 is for the different bands, e.g., All Band: 2300/850 742, Only Band 2300:2300 744, Only Band 850:850 746. A Cell Category 750 is for the four categories of selected reports, e.g., Pre Date Cells 752 that includes Pre KPIs of neighbors of the selected sites (not including the cells of the selected site 754), Post Date Cells 756 that includes Post KPIs of the Co-site Neighbors of the selected sites 758, Pre Date Target Sectors 760 that includes Pre KPIs of neighbors of the selected sites (not including the cells of the selected site) 762, and Post Date Target Sectors 764 that includes Post KPIs of the Co-site Neighbors of the selected sites 766.

A Cell Name 770 identifies the Name of the cell 772. A Date 780 is used for the Pre User Selected Date/EMS Live Date 782. A Time 790 identifies the three network busy hours 792. For example, the three network busy hours are 11:00-12:00 Hrs. 794, 17:00-18:00 Hrs. 796, and 21:00-22:00 Hrs. 798. The three network busy hours are defined by the user so that the data is based on busy times for the cells. Performance issues, as determined according to KPIs, occur in the busier times because, for example, the network experience a maximum load.

FIG. 8 shows a Cluster Report Worksheet 800 according to at least one embodiment.

In FIG. 8, the Cluster Report Worksheet 800 includes a Report Header Name 810 and a Report Header Description 820 for different parameters are shown. The Cluster Report Worksheet 800 provides data for 8 neighbor sites and the New Site, as shown in the New Site Impact window and in the New Site "on-Air window in FIG. 2. The Custer Report Worksheet 800 includes the aggregated KPIs for the 9 sites (the 8 neighbor sites and the New Site).

The Custer Report Worksheet 800 includes a Site Name 830 associated with the Name of the Site 832. A Band 840 is for the different bands, e.g., All Band: 2300/850 842, Only Band 2300:2300 844, Only Band 850:850 846. KPI 850 is for the KPI List compared in the Detailed Report Worksheet 852.

Cluster Pre KPIs 860 is for the Aggregated value of KPIs of neighbors of the New Site without the New Site 862. Cluster Post Pre KPIs 870 is for the Aggregated value of KPIs of Neighbors of the New Site without the New Site 872. Delta 880 is for Cluster Post KPI-Cluster Pre KPI 882. % Delta 890 is for ((Cluster Post KPI-Cluster Pre KPI)/(Cluster Pre KPIs))*100 892.

1 Day level reports are prepared for 3 hours which are considered as busy hours during the day. (11:00~12:00 Hrs.), (17:00~18:00 Hrs.), (21:00~22:00 Hrs.) For 1 Day Reports, the Detailed Report Worksheet uses calculated KPIs per Cell for cells of the cluster. The KPIs are calculated per cell as per the attached sheet. For 1 Day Reports, the Cluster Report Worksheet aggregates the KPIs calculated in the detailed report. Column KPI will have a list of KPIs, wherein the list is aggregated from the cells in the Detailed Report Worksheet of FIG. 7.

The 7 Day Level Report contains the KPI comparison along with source and neighbor cells. 7 Day daily KPIs are aggregated for the Pre and Post dates selected as per the logic above. Then Cluster report will show the aggregated value for the KPIs at cluster Level. 7 Day Level Reports include two worksheets in a similar format as mentioned above.

Figure 9:
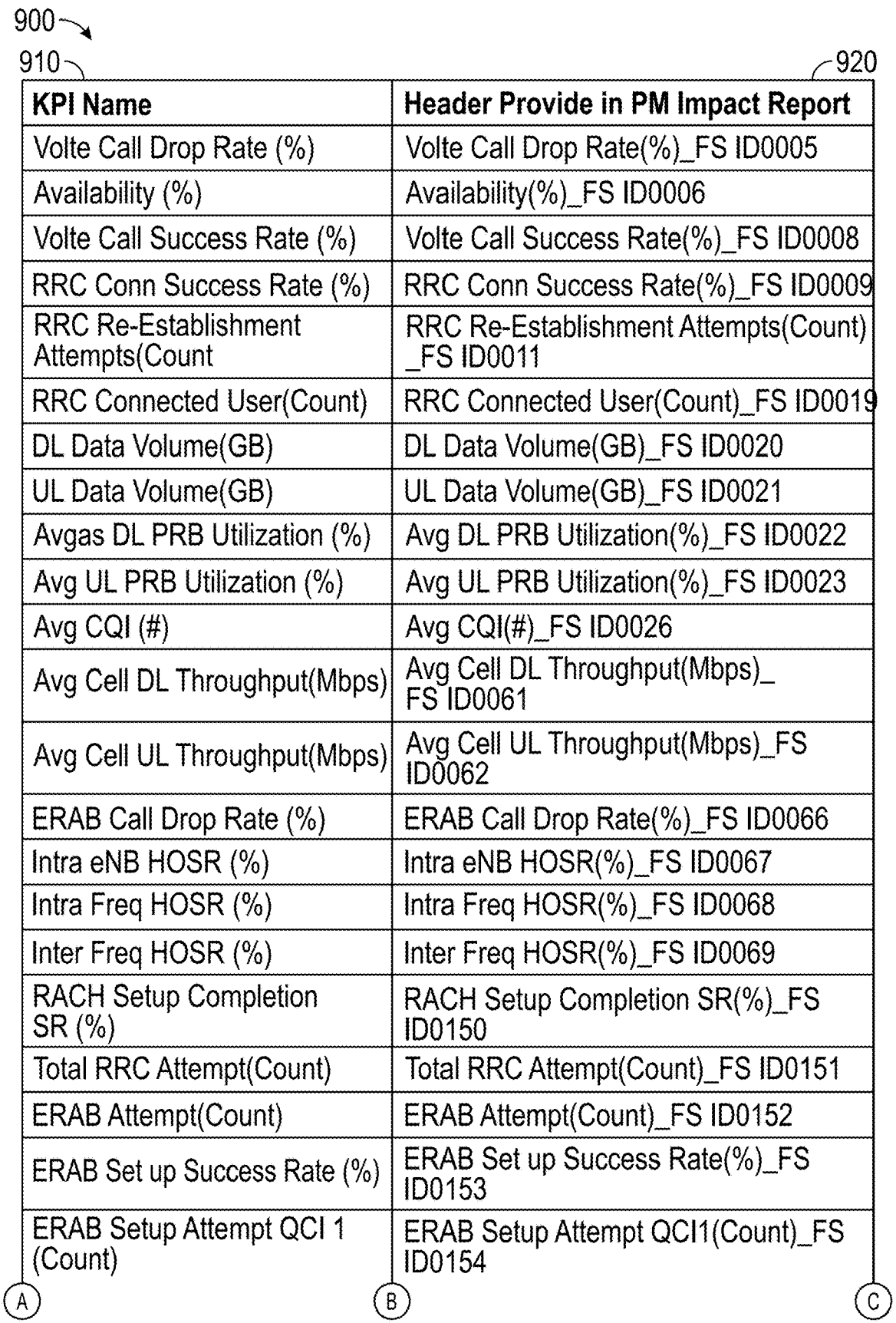
FIG. 9 is a list of Key Performance Indicators (KPIs) calculated for performing new site impact analysis according to at least one embodiment.

For the 7 Day Level Report, the Cluster Report shows aggregated values of source and its neighbor cells for the new site as shown in FIG. 9 below, the 7 Day Level Report, the Cluster Report aggregates the KPIs calculated in the detailed report for 7 pre days and 7 post days depending upon the selections mentioned above.

For the 7 Day Level Report, the Detailed Report shows the seven days KPI value for each cell. These values will be aggregated to show the Cluster Report.

FIG. 9 is a list of Key Performance Indicators (KPIs) 900 calculated for performing new site impact analysis according to at least one embodiment.

In FIG. 9, the KPI list 900 provides the KPI Name 910 and the Header Provided in the PM Impact Report 920. The KPI list 900 is not meant to be exhaustive. Further, the KPI list 900 may include fewer KPIs than shown. Configuration input is provided, on the GUI 112 of New Site Impact Analyzer 110 shown in FIG. 1, to configured at least one of a cluster of neighbor cells and the new site to improve performance of the network as indicated by KPIs in the KPI list 900. After configuring the at least one of the cluster of neighbor cells and the new site to improve performance of the network as indicated by KPIs in the KPI list 900, the new site is brought on-air.

Figure 10:
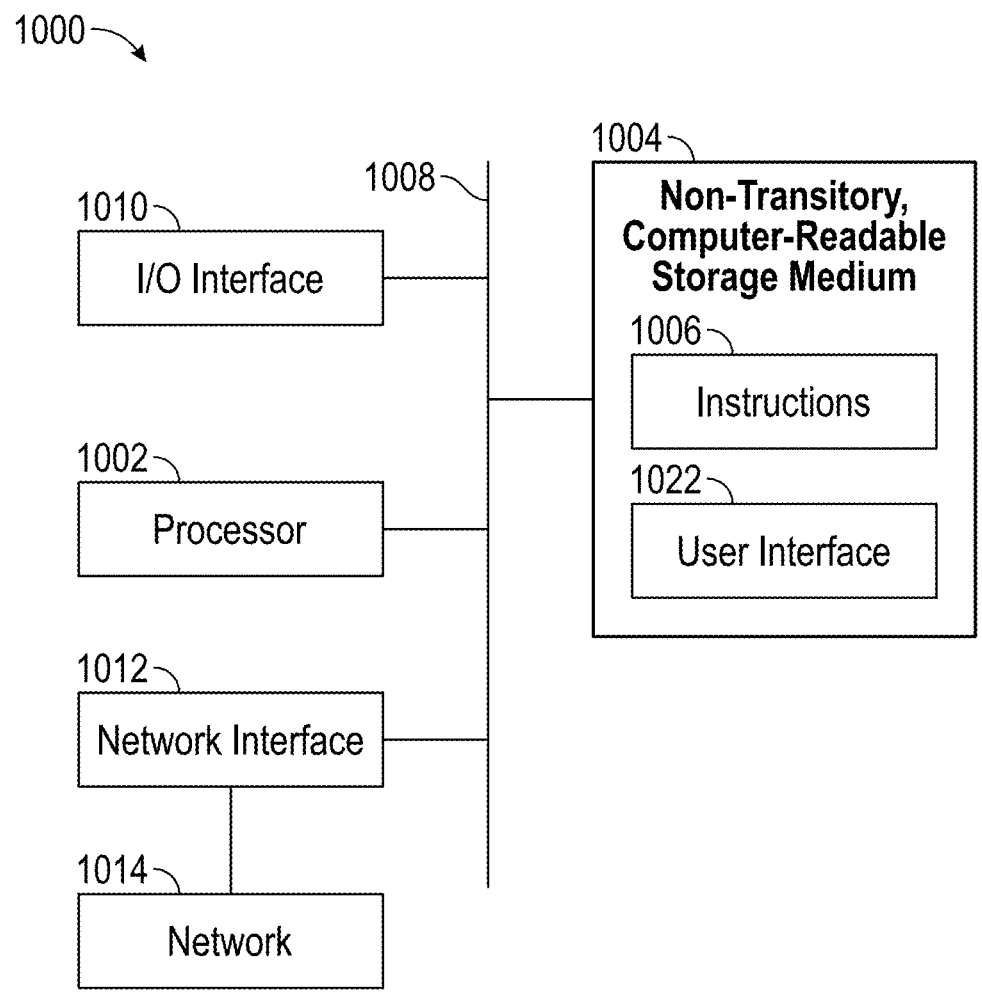
FIG. 10 is a high-level functional block diagram of a processor-based system according to at least one embodiment.

At least one embodiment of the method includes obtaining KPI data from a KPI database, presenting, on a display device, a new site impact analysis graphical user interface (GUI) for analyzing an impact of a new site to the network, presenting, on the display device, a report GUI for making a selection for generating a report including data associated with the impact of the new site, based on the KPI data, generating the report according to the selection made using the report GUI and displaying the report on the display device, configuring, on the new site impact analysis GUI, at least one of a cluster of neighbor cells and the new site to improve performance of the network based on the generated report, and after configuring the at least one of the cluster of neighbor cells and the new site, using the new site impact analysis GUI to bring the new site on-air. FIG. 10 is a high-level functional block diagram of a processor-based system 1000 according to at least one embodiment.

In at least one embodiment, processing circuitry 1000 presents a new site impact analyzer for improving performance of a network. Processing circuitry 1000 implements new site impact analyzer and enables analysis and configuration of at least one of a cluster of neighbor cells and the new site using processor 1002. Processing circuitry 500 also includes a non-transitory, computer-readable storage medium 1004 that is used to implement new site impact analyzer. Storage medium 1004, amongst other things, is encoded with, i.e., stores, instructions 1006, i.e., computer program code that are executed by processor 1002 causes processor 1002 to perform operations for implementing the new site impact analyzer and for enabling analysis and configuration of at least one of a cluster of neighbor cells and the new site. Execution of instructions 1006 by processor 1002 represents (at least in part) a visualization application for adding a new site at a selected location, analyzing the impact of the new site on the network, and showing performance of the at least one of a cluster of neighbor cells and the new site, wherein the visualization application implements at least a portion of the methods described herein in accordance with one or more embodiments (hereinafter, the noted processes and/or methods).

Processor 1002 is electrically coupled to computer-readable storage medium 1004 via a bus 1008. Processor 1002 is electrically coupled to an Input/output (I/O) interface 1010 by bus 1008. A network interface 1012 is also electrically connected to processor 1002 via bus 1008. Network interface 1012 is connected to a network 1014, so that processor 1002 and computer-readable storage medium 1004 connect to external elements via network 1014. Processor 1002 is configured to execute instructions 1006 encoded in computer-readable storage medium 1004 to cause processing circuitry 1000 to be usable for performing at least a portion of the processes and/or methods. In one or more embodiments, processor 1002 is a Central Processing Unit (CPU), a multi-processor, a distributed processing system, an Application Specific Integrated Circuit (ASIC), and/or a suitable processing unit.

Processing circuitry 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

Processing circuitry 1000 also includes network interface 1012 coupled to processor 1002. Network interface 1012 allows processing circuitry 1000 to communicate with network 1014, to which one or more other computer systems are connected. Network interface 1012 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or IEEE-864 (Institute of Electrical and Electronics Engineers-864).

Processing circuitry 1000 is configured to receive information through I/O interface 1010. The information received through I/O interface 1010 includes one or more of instructions, data, design rules, libraries of cells, and/or other parameters for processing by processor 1002. The information is transferred to processor 1002 via bus 1008. Processing circuitry 1000 is configured to receive information, such as selection of a location of a new site and configuration input, via a User Interface (UI) through I/O interface 1010. The information is stored in computer-readable medium 1004 as UI 1022.

In one or more embodiments, one or more non-transitory computer-readable storage media 1004 having stored thereon instructions (in compressed or uncompressed form) that may be used to program a computer, processor, or other electronic device) to perform processes or methods described herein. The one or more non-transitory computer-readable storage media 1004 include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 1004 includes a Compact Disk-Read Only Memory (CD-ROM), a Compact Disk-Read/Write (CD-R/W), and/or a Digital Video Disc (DVD).

In one or more embodiments, storage medium 1004 stores computer program code 1006 configured to cause processing circuitry 1000 to perform at least a portion of the processes and/or methods for providing new site impact analysis for improving performance of the network. In one or more embodiments, storage medium 1004 also stores information, such as algorithm which facilitates performing at least a portion of the processes and/or methods for providing new site impact analysis for improving the performance of the network. Accordingly, in at least one embodiment, the processor circuitry 1000 performs a method for performing new site impact analysis for improving the performance of the network. The process, which includes obtaining Key Performance Indicator (KPI) data from a KPI database, presenting, on a display device, a new site impact analysis graphical user interface (GUI) for analyzing an impact of a new site to the network, presenting, on the display device, a report GUI for making a selection for generating a report including data associated with the impact of the new site, based on the KPI data, generating the report according to the selection made using the report GUI and displaying the report on the display device, configuring, on the new site impact analysis GUI, at least one of a cluster of neighbor cells and the new site to improve performance of the network based on the generated report, and after configuring the at least one of the cluster of neighbor cells and the new site, using the new site impact analysis GUI to bring the new site on-air, provides at least the advantages of enabling a user to automatically calculate and visualize the impact of new on-air sites over the UI and the reports. The information is refreshed on a regular basis, e.g., every day. Pre-analysis and post-analysis of Key Performance Indicators (KPIs) is able to be performed up to 10 days pre- and post-on-air date of new sites. The process runs automatically for a large number of sites, including their cluster sites, and efficiently calculates the improvement of the vicinity due to an addition of a new site and improving performance of the network in terms of a new coverage area and performance of existing neighbor cell sites.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for providing new site impact analysis for network improvement, comprising:
   obtaining Key Performance Indicator (KPI) data from a KPI database;
   presenting, on a display device, a before new site impact analysis graphical user interface (GUI) visual representation of performance of existing cell sites based on the KPI data for analyzing an impact of addition of a new site to a network;
   adding, on the new site impact analysis GUI, a new site to the network;
   presenting, on the new site impact analysis GUI, a visual representation of updated performance of at least one of a cluster of neighbor cells and the new site based on the addition of the new site to the network;
   presenting, on the display device, a report GUI for making a selection for generating a report including data associated with the impact of the addition of the new site to the network;
   based on the KPI data, generating the report according to the selection made using the report GUI and displaying the report on the display device;
   based on the report, configuring, on the new site impact analysis GUI, at least one of a cluster of neighbor cells and the new site to provide improved performance of the at least one of the cluster of neighbor cells and the new site;
   bringing the new site on-air using the new site impact analysis GUI; and
   after bringing the new site on-air, presenting, on a new site on-air GUI, a visual representation of the improved performance of the at least one of the cluster of neighbor cells and the new site.

2. The method of claim 1, wherein the presenting the report GUI includes presenting a first option for selecting one of a new site impact option and a pre-post option, and a second option for selecting one of a 1 day option and a 7 day option, a combination of the first option and the second option providing a selection one of four reports, wherein the selecting the new site impact option prepares the report of the new site impact on the cluster of neighbor cells around the new site, selecting the pre-post option prepares the report on the cluster of neighbor cells of any selected existing on-air site, selecting the 1 day option calculates the KPI data 1 day prior to the new site becoming on-air and 1 day after the new site becoming on-air, and selecting the 7 day option calculates the KPI data 7 days prior to the new site becoming on-air and 7 day after the new site becoming on-air.

3. The method of claim 1, wherein the generating the report includes generating a detailed report worksheet and a cluster report worksheet.

4. The method of claim 3, wherein the generating the detailed report worksheet includes generating a report of KPI data per cell, and wherein the generating the cluster report worksheet includes KPI data for the cluster of neighbor cells and the KPI data for the new site.

5. The method of claim 1, wherein the obtaining the KPI data from the KPI database further comprises
   reading configuration data from an analytic repository;
   fetching data from inventory included in the configuration data;
   reading KPI data for specific Network Elements (NE) from the KPI database;
   obtaining neighbor cell information from cell inventory;
   acquiring time range information from the configuration data;
   processing the configuration data, the KPI data, the neighbor cell information, and the time range information to determine KPI data for network elements; and
   storing, in a server, an aggregated database that includes the network elements and the determined KPI data associated with the network elements.

6. The method of claim 1, wherein the presenting, on the display device, the before new site impact analysis GUI further includes:
   presenting a display of the cluster of neighbor cells and an indication of performance of the neighbor cells in the cluster, the indication of the performance of the neighbor cells in the cluster being used to determine whether to add the new site to improve the performance of the network.

7. The method of claim 1, wherein the presenting, on the display device, the new site impact analysis GUI further includes:
presenting a new site impact window, the new site impact window including a display of the cluster of neighbor cells, the new site, and an indication of performance of the cluster of neighbor cells after configuring the at least one of the cluster of neighbor cells and the new site to improve performance of the network; and
wherein the presenting the new site on-air GUI includes presenting a display of the cluster of neighbor cells, the new site, and the indication of performance of the cluster of neighbor cells and the new site after the new site is brought on-air.

8. A device for providing new site impact analysis for network improvement, the device configured to:
obtain Key Performance Indicator (KPI) data from a KPI database;
present, on a display device, a before new site impact analysis graphical user interface (GUI) a visual representation of performance of existing cell sites based on the KPI data for analyzing an impact of addition of a new site to the network;
adding, on the new site impact analysis GUI, a new site to the network;
presenting, on a new site impact analysis GUI, a visual representation of updated performance of the at least one of the cluster of neighbor cells and the new site based on the addition of the new site to the network;
present, on the display device, a report GUI for receiving a selection for generating a report including data associated with the impact of the addition of the new site to the network;
based on the KPI data, generate the report according to the selection received via the report GUI and displaying the report on the display device;
receive configuration input, on the new site impact analysis GUI, for configuring at least one of a cluster of neighbor cells and the new site to provide improved performance of the at least one of the cluster of neighbor cells and the new site based on the report; and
bring the new site on-air using the new site impact analysis GUI; and
after bringing the new site on-air, present, on a new site on-air GUI, a visual representation of the improved performance of the at least one of the cluster of neighbor cells and the new site.

9. The device of claim 8, wherein the report GUI includes a first option for selecting one of a new site impact option and a pre-post option, and a second option for selecting one of a 1 day option and a 7 day option, a combination of the first option and the second option providing a selection one of four reports, wherein the new site impact option prepares the report of the new site impact on the cluster of neighbor cells around the new site, the pre-post option prepares the report on the cluster of neighbor cells of any selected existing on-air site, the 1 day option calculates the KPI data 1 day prior to the new site becoming on-air and 1 day after the new site becoming on-air, and the 7 day option calculates the KPI data 7 days prior to the new site becoming on-air and 7 day after the new site becoming on-air.

10. The device of claim 8, wherein the report includes a detailed report worksheet and a cluster report worksheet.

11. The device of claim 10, wherein the detailed report worksheet includes a report of KPI data per cell, and wherein the cluster report worksheet includes KPI data for the cluster of neighbor cells and the KPI data for the new site.

12. The device of claim 8, further configured to obtain the KPI data from the KPI database by further performing operations to:
read configuration data from an analytic repository;
fetch data from inventory included in the configuration data;
read KPI data for specific Network Elements (NE) from the KPI database;
obtain neighbor cell information from cell inventory;
acquire time range information from the configuration data;
process the configuration data, the KPI data, the neighbor cell information, and the time range information to determine KPI data for network elements; and
store, in a server, an aggregated database that includes the network elements and the determined KPI data associated with the network elements.

13. The device of claim 8, wherein the before new site impact analysis GUI further includes:
a a display of the cluster of neighbor cells and an indication of performance of the neighbor cells in the cluster, the indication of the performance of the neighbor cells in the cluster indicating whether to add the new site to address to improve the performance of the neighbor cells in the cluster.

14. The device of claim 8, wherein the new site impact analysis GUI further includes:
a new site impact window displayed on the new site impact analysis GUI, the new site impact window including a display of the cluster of neighbor cells, the new site, and an indication of performance of the cluster of neighbor cells after configuring the at least one of the cluster of neighbor cells and the new site to improve performance of the network; and
wherein the new site on-air GUI includes a new site on-air window, the new site on-air window including a display of the cluster of neighbor cells, the new site, and the indication of performance of the cluster of neighbor cells and the new site after the new site is brought on-air.

15. A non-transitory computer-readable media having computer-readable instructions stored thereon, which when executed perform operations for providing new site impact analysis for network improvement comprising:
obtaining Key Performance Indicator (KPI) data from a KPI database;
presenting, on a display device, a before new site impact analysis graphical user interface (GUI) a visual representation of performance of existing cell sites based on the KPI data for analyzing an impact of addition of a new site to the network;
adding, on the new site impact analysis GUI, a new site to the network;
presenting, on a new site impact analysis GUI, a visual representation of updated performance of the at least one of the cluster of neighbor cells and the new site based on the addition of the new site to the network;
presenting, on the display device, a report GUI for making a selection for generating a report including data associated with the impact of the addition of the new site to the network;
based on the KPI data, generating the report according to the selection made using the report GUI and displaying the report on the display device;

based on the report, configuring, on the new site impact analysis GUI, at least one of a cluster of neighbor cells and the new site to provide improved performance of the at least one of the cluster of neighbor cells and the new site;

bringing the new site on-air using the new site impact analysis GUI; and after bringing the new site on-air, presenting, on a new site on-air GUI, a visual representation of the improved performance of the at least one of the cluster of neighbor cells and the new site.

16. The non-transitory computer-readable media of claim 15, wherein the presenting the report GUI includes presenting a first option for selecting one of a new site impact option and a pre-post option, and a second option for selecting one of a 1 day option and a 7 day option, a combination of the first option and the second option providing a selection one of four reports, wherein the selecting the new site impact option prepares the report of the new site impact on the cluster of neighbor cells around the new site, selecting the pre-post option prepares the report on the cluster of neighbor cells of any selected existing on-air site, selecting the 1 day option calculates the KPI data 1 day prior to the new site becoming on-air and 1 day after the new site becoming on-air, and selecting the 7 day option calculates the KPI data 7 days prior to the new site becoming on-air and 7 day after the new site becoming on-air.

17. The non-transitory computer-readable media of claim 15, wherein the generating the report includes generating a detailed report worksheet and a cluster report worksheet.

18. The non-transitory computer-readable media of claim 17, wherein the generating the detailed report worksheet includes generating a report of KPI data per cell, and wherein the generating the cluster report worksheet includes KPI data for the cluster of neighbor cells and the KPI data for the new site.

19. The non-transitory computer-readable media of claim 15, wherein the obtaining the KPI data from the KPI database further comprises reading configuration data from an analytic repository;

fetching data from inventory included in the configuration data;

reading KPI data for specific Network Elements (NE) from the KPI database;

obtaining neighbor cell information from cell inventory;

acquiring time range information from the configuration data;

processing the configuration data, the KPI data, the neighbor cell information, and the time range information to determine KPI data for network elements; and storing, in a server, an aggregated database that includes the network elements and the determined KPI data associated with the network elements.

20. The non-transitory computer-readable media of claim 15, wherein the presenting, on the display device, the before new site impact analysis GUI further includes:

presenting a display of the cluster of neighbor cells and an indication of performance of the neighbor cells in the cluster, the indication of the performance of the neighbor cells in the cluster being used to determine whether to add the new site to address to improve the performance of the neighbor cells in the cluster;

wherein the presenting a new site impact window, the new site impact window including a display of the cluster of neighbor cells, the new site, and the indication of performance of the cluster of neighbor cells after configuring the at least one of the cluster of neighbor cells and the new site to improve performance of the network; and wherein the presenting the new site on-air window includes presenting a display of the cluster of neighbor cells, the new site, and the indication of performance of the cluster of neighbor cells and the new site after the new site is brought on-air.

\* \* \* \* \*